US006723958B2

(12) United States Patent
Brandt et al.

(10) Patent No.: US 6,723,958 B2
(45) Date of Patent: Apr. 20, 2004

(54) DISPLAY WITH A HEATER

(75) Inventors: Peter Brandt, Aschaffenburg (DE); Wolfgang Siegel, Oberndorf (DE)

(73) Assignee: Siemens Aktiengesellschaft, München (DE)

( * ) Notice: Subject to any disclaimer, the term of this patent is extended or adjusted under 35 U.S.C. 154(b) by 52 days.

(21) Appl. No.: 09/991,562

(22) Filed: Nov. 20, 2001

(65) Prior Publication Data

US 2002/0079304 A1 Jun. 27, 2002

(30) Foreign Application Priority Data

Nov. 30, 2000 (DE) .......................................... 100 59 518

(51) Int. Cl.[7] .............................................. H05B 1/00
(52) U.S. Cl. ...................... 219/209; 219/210; 219/494; 374/183; 374/170; 349/20; 349/33; 349/72; 349/147
(58) Field of Search .............................. 219/209, 210, 219/494; 374/183, 170; 349/20, 21, 33, 72, 74, 147

(56) References Cited

U.S. PATENT DOCUMENTS 4,621,261 A * 11/1986 Hehlen et al. ......... 340/825.52
5,029,982 A * 7/1991 Nash ......................... 350/331
6,089,751 A * 7/2000 Conover et al. ............ 374/183
6,309,100 B1 * 10/2001 Lutnaes ...................... 374/183

* cited by examiner

Primary Examiner—Shawntina Fuqua
(74) Attorney, Agent, or Firm—Martin A. Farber

(57) ABSTRACT

Display with a heater, a) the display having at least one display glass, b) the heater having an electrically operated heating element connected to a voltage supply (UB, GND), c) the heating element comprising a thin layer, d) the layer being made of a material forming an electrical resistance, and e) the layer being applied over a surface area to the at least one display glass or being embedded over a surface area in the display. f) A first measuring instrument (4) is provided, which determines the resistance value of the heating element, g) a second measuring instrument (5) is provided, which determines the level of the voltage present at the heating element, h) a third measuring instrument (3) is provided, which senses the current ambient temperature at the display, i) a memory (7) is provided, which stores the determined resistance value of the heating element, j) a logic unit (6) is provided, which determines for the stored resistance value in accordance with the determined voltage and the determined ambient temperature a current-supplying period for the heating element necessary to produce that heat output which will heat up the display to a certain operating temperature within a predetermined time, and k) a switching element (8) actuated by the logic unit (6) is provided, which regulates the current flow through the heating element connected to the voltage supply (UB, GND) for the current-supplying period determined.

7 Claims, 1 Drawing Sheet

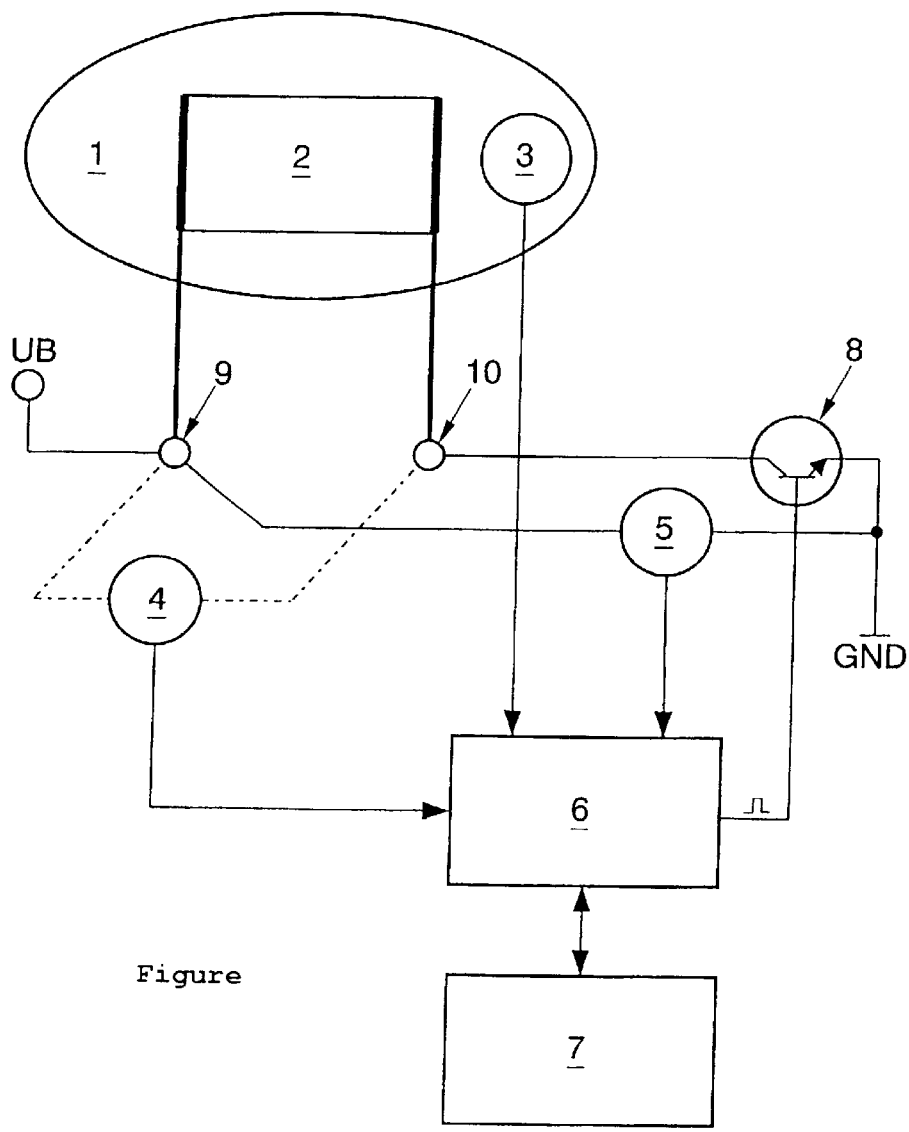
Figure

DISPLAY WITH A HEATER

FIELD AND BACKGROUND OF THE INVENTION

The invention relates to a display with a heater according to the precharacterizing clause of the first claim. According to this, the invention relates in particular to a display with a heater, the display having at least one display glass and the heater having an electrically operated heating element, the heating element comprising a thin, preferably transparent layer of a material forming an electrical resistance, the layer being applied over a surface area to the at least one display glass or being embedded over a surface area in the display.

Displays are being increasingly used, for example, in automotive engineering, for example LC displays (liquid crystal displays), in order to convey information to the driver. Such a display may be, for example, an integral part of an instrument cluster which is arranged in the dashboard of the vehicle. The display fitted in the vehicle is expected to be fully functional even at low ambient temperatures, although, for example in the case of an LC display, the contrast and, consequently, the quality of the display decrease markedly at low ambient temperatures. For this reason, displays fitted in a vehicle generally require a heater in order to heat them up to a suitable operating temperature within a short time when there are low ambient temperatures.

In the case of the heater in question here, the heating element heats up the display in accordance with the current intensity which occurs when the layer applied to the display and forming an electrical resistance is connected to a voltage supply. This voltage supply generally comprises the onboard electrical system of the vehicle, it being intended that the heating element can be connected to the onboard electrical system directly, i.e. without interconnecting a voltage-stabilizing circuit arrangement. With regard to the heat output which can be generated by the heating element, however, it must be taken into account that the level of the voltage present at the heating element may have different nominal values depending on the vehicle category and that the voltage of the onboard electrical system is subject to considerable fluctuations during the operation of the vehicle. Moreover, a heating element which comprises a thin layer applied to a display glass or a thin layer embedded in the display glass has a great range of variation in its resistance value, because both the layer thickness, and consequently the resistance per unit area, and the chemical composition of the material application are subject to relatively great tolerances in the production process. Because both the voltage present at the heating element and the value for the resistance forming the heating element vary considerably within certain limits, further measures are required for generating a heat output appropriate for requirements, which must take into account the currently prevailing ambient temperature to have an optimum effect. Otherwise, the heat generated may not be sufficient to make the display operational within a short time, or the display itself or its mounts, usually consisting of a plastic, may be destroyed by overheating.

SUMMARY OF THE INVENTION

It is consequently the object of the present invention to present a display with a heater, the heater ensuring a heat output which, in accordance with the ambient temperature and in spite of considerable fluctuations in the voltage supply to which the heating element is connected, and in spite of a range of variation in the resistance values of the heating element, makes the display operational in a short time even at low ambient temperatures.

The object is achieved by a display with a heater having the features of the first claim. In this case, the heater has an electrically operated heating element connected to a voltage supply, the display having at least one display glass and the heating element comprising a thin, preferably transparent layer, the layer consisting of a material forming an electrical resistance, the layer being applied over a surface area to the at least one display glass or being embedded over a surface area in the display. The solution achieving this is distinguished by the features a) that a first measuring instrument is provided, which determines the resistance value of the heating element, b) that a second measuring instrument is provided, which determines the level of the voltage present at the heating element, c) that a third measuring instrument is provided, which senses the current ambient temperature at the display, d) that a memory is provided, which stores the determined resistance value of the heating element, e) that a logic unit is provided, which determines for the stored resistance value in accordance with the determined voltage and the determined ambient temperature a current-supplying period for the heating element necessary to produce that heat output which will heat up the display to a certain operating temperature within a predetermined time, and f) that a switching element actuated by the logic unit is provided, which regulates the current flow through the heating element connected to the voltage supply for the current-supplying period determined.

As a result, the measures mentioned above provide the heater of a display operated in a vehicle with a control system which regulates the current flowing through the heating element in accordance with the measured ambient temperature, the actual resistance value of the heating element, the level of the voltage present at the heating element and also taking into account the required heat output to heat up the display to a certain operating temperature within a predetermined time. In this case, a logic unit influences the current flow through the heating element by means of a switching element.

BRIEF DESCRIPTION OF THE DRAWINGS

The proposed control system is now explained in more detail on the basis of an attached FIGURE with a simplified schematic drawing.

DETAILED DESCRIPTION OF THE PREFERRED EMBODIMENT

In an instrument cluster 1 arranged in a vehicle there is a heatable LC display 2. In this FIGURE, the reference numeral 2 relates to the display together with the heating element arranged on it or embedded in it. In the case taken as a basis here, the heater of the display essentially comprises a heating element which is formed by a preferably transparent layer only a few nanometers thick, the layer consisting for example of indium tin oxide, which is a material forming an electrical resistance. LC displays generally have at least two glass plates which are joined together over their surface area and enclose a liquid-crystal layer on their contact surfaces lying against each other. The layer forming the heating element is either applied over a surface area on an outer side of one of these glass plates or is arranged on the inside between these two glass plates and is consequently embedded in the display. In both configurational cases, the heating element is provided with electrical contacts 9 and 10. By means of these contacts 9 and 10, the heating element can be connected to a voltage supply by the terminals UB and GND, the onboard electrical system of the vehicle usually being chosen for the voltage supply. Depending on the vehicle category, the nominal voltage of the onboard electrical system may in this case be, for example, 12 volts (cars), 24 volts (trucks and buses) or recently also 42 volts.

Modern LC displays generally have the electronic circuit arrangements required for the operation of the LC display, such as drivers, controllers and memories, in a structural unit connected to the glass plates. There are also designs available which already provide a measuring instrument 3 on the glass plates, capable of sensing the current ambient temperature at the display. This measuring instrument 3 for example takes the form of an NTC resistor.

During the assembly of the LC display 2, the resistance value of its heating element can be determined, for example, in an automated measuring operation by attaching an ohmmeter to the contacts 9 and 10 of the heating element. The measured value determined by this first measuring instrument 4 is then stored with the assistance of a programming device in a writable and readable memory 7, this memory 7 being connected to a logic unit 6 and controlled by the latter. This logic unit 6 and the memory 7 are preferably realized by the controller of the LC display 2 and are consequently integrated in the structural unit of the LC display 2. Suitable for this memory 7 are EEPROM and flash memory modules.

Moreover, the logic unit 6 also receives measured values concerning the level of the voltage present at the heating element and also concerning the current ambient temperature at the display. Consequently, a second measuring instrument 5 and a third measuring instrument 3 are then realized, to be specific a measuring instrument 5 for determining the level of the voltage present at the heating element and a measuring instrument 3 for sensing the current ambient temperature at the display.

From these incoming measured values, the logic unit 6 determines, by using and running a program available to it, whether it is necessary at all to supply current to the heating element, and if so which current-supplying period is necessary for the heating element to apply that heat output which will heat up the display to a certain operating temperature within a predetermined time. In this case, the time available for the heating up of the LC display may also be adjustable, may lie in the range of two or three seconds and be able to be entered as a value in the memory 7 connected to the logic unit 6 by means of a programming device, for example during the assembly of the LC display.

If the logic unit 6 establishes that it is necessary for current to be supplied to the heating element, it actuates according to the requirements determined a switching element 8 lying in the current path from the heating element to the voltage supply, for example by the output of a pulse-width-modulated signal to the base terminal of a transistor, if the switching element 8 is designed as a transistor. Other controllable semiconductor switches may also be chosen as the switching element 8. The logic unit 6 interrupts the current flow through the heating element by a corresponding activation of the switching element 8 as soon as the measured values coming in at the logic unit 6 indicate that the LC display 2 has reached an adequate operating temperature. The heat output is regulated by this influencing of the current flow by the heating element.

The control system proposed here for the heater of a display has the advantage that it can be implemented at low cost, because it relies largely on hardware components existing in modern LC displays (logic unit, memory, temperature sensor). By reading out from coding values, determined for example in measured curves which can be stored in the memory 7 connected to the logic unit 6, for example during the assembly of the LC display 2, and subsequent adjustment of the current-supplying period of the heating element in accordance with the respective coding value, it is possible under the given operating conditions for the heating element comprising a thin layer of a resistance material, in spite of considerable fluctuations in the voltage supply to which the heating element is connected, and in spite of a large range of variation in the resistance values of the heating element, for a heater optimized in its effect to be realized for the display.

We claim:

1. Display with a heater, the display having at least one display glass, the heater having an electrically operated heating element connected to a voltage supply, the heating element comprising a thin layer, the layer made of a material having an electrical resistance, wherein a value of the resistance has been determined by use of a first measuring instrument, the layer being applied over a surface area to the at least one display glass or being embedded over a surface area in the display, wherein the display further comprises:

a second measuring instrument which determines a level of voltage present at the heating element, a third measuring instrument which senses current ambient temperature at the display, a memory which stores the determined resistance value of the heating element, a logic unit connected to the memory, the logic unit determining, for the stored resistance value in accordance with the determined voltage and the determined ambient temperature, a current-supplying period for applying electric current the heating element necessary to produce that heat output which will heat up the display to a certain operating temperature within a predetermined time, and a switching element, actuated by the logic unit, for regulating current flow through the heating element during the current-supplying period.

2. Display with a heater according to claim 1, wherein the heating element comprises a layer of indium tin oxide.

3. Display with a heater according to claim 1, wherein the resistance value of the heating element is determined and stored in the memory during assembly or the display.

4. Display with a heater according to claim 1, wherein at least the logic unit, the memory and the third measuring instrument are realized by elements of an electronic circuit assembly employed for operation of the display.

5. Display with a heater according to claim 1, wherein the switching element is a transistor or another semiconductor switch, which is activated by the logic unit by a pulse-width-modulated signal.

6. Display with a heater according to claim 1, wherein the time for heating up the display to the desired operating temperature is adjustable and enterable as a value in the memory.

7. Display with a heater according to claim 1, wherein the voltage supply for the heating element is an onboard electrical system of a vehicle.

* * * * *